United States Patent
Perez (10) Patent No.: US 8,422,221 B2
(45) Date of Patent: Apr. 16, 2013

(54) TELEVISION STAND

(75) Inventor: Juan Antonio Perez, Sabadell (ES)

(73) Assignee: Sony Espana SA, Barcelona (ES)

( * ) Notice: Subject to any disclaimer, the term of this patent is extended or adjusted under 35 U.S.C. 154(b) by 137 days.

(21) Appl. No.: 13/019,552

(22) Filed: Feb. 2, 2011

(65) Prior Publication Data

US 2011/0199719 A1   Aug. 18, 2011

(30) Foreign Application Priority Data

Feb. 17, 2010   (GB) ................................... 1002716.7

(51) Int. Cl.
  *G06F 1/16*   (2006.01)
(52) U.S. Cl.
  USPC ............ 361/679.59; 361/679.21; 361/679.29; 248/371; 248/918
(58) Field of Classification Search .............. 361/697.69
  See application file for complete search history.

(56) References Cited

U.S. PATENT DOCUMENTS

| | | | | |
|---|---|---|---|---|
| 6,741,458 | B2* | 5/2004 | Wu | 361/679.21 |
| 7,516,925 | B2* | 4/2009 | Sawai et al. | 248/146 |
| 7,614,596 | B2* | 11/2009 | Takao | 248/371 |
| 8,002,223 | B2* | 8/2011 | Sawai et al. | 248/146 |
| 2007/0091554 | A1* | 4/2007 | Uchizono et al. | 361/681 |
| 2009/0121097 | A1* | 5/2009 | Takao | 248/158 |

FOREIGN PATENT DOCUMENTS

| | | |
|---|---|---|
| CH | 653 464 A5 | 12/1985 |
| CN | 201185747 Y | 1/2009 |
| CN | 201269956 Y | 7/2009 |
| DE | 20 2005 013 312 U1 | 12/2005 |

OTHER PUBLICATIONS

United Kingdom Search Report issued May 25, 2010, in Great Britain 1002716.7, filed Feb. 17, 2010.

* cited by examiner

*Primary Examiner* — Anthony Q Edwards
(74) *Attorney, Agent, or Firm* — Oblon, Spivak, McClelland, Maier & Neustadt, L.L.P.

(57) ABSTRACT

A display device may be mounted on a stand. The stand may present a display screen of the display device at an angle in which it is easy for the user to view the display screen. The desired tilt angle of the display screen may vary depending on where it is positioned, and where it is viewed from. The present invention provides a stand in which the tilt angle of a display device can be changed between at least two different angles. The display device is securely mounted to the stand at all tilt angles.

16 Claims, 5 Drawing Sheets

TELEVISION STAND

CROSS-REFERENCE TO RELATED APPLICATIONS

This application is based upon and claims the benefit of priority from British Application No. 1002716.7 filed 17 Feb. 2010, the entire contents of which are incorporated by reference.

BACKGROUND OF THE INVENTION

1. Field of the Invention

The present invention relates to a display apparatus, in particular a stand for a display device having a display screen. The present invention also relates to a display apparatus including a display device and a stand.

2. Description of the Related Art

Display devices, such as televisions, are conventionally mounted on stands. This enables, for example, the screen of the display to be presented to a user at the correct height. Some stands include a moving joint that allows the screen to be rotated about a horizontal axis. In this way, the tilt angle of the screen can be adjusted in a continuous manner by moving the joint.

It is advantageous for any stand on which a display device may be mounted to be robust and stable.

The present invention recognises that conventional stands for display devices do not allow the display device to be tilted so as to be able to point the screen at different angles relative to vertical in a simple, reliable and robust manner.

OBJECTS AND SUMMARY OF THE INVENTION

According to embodiments of the present invention, there is provided a display device comprising:
  a display device having a planar display screen; and
  a support stand for supporting the display device, the support stand comprising:
    a base portion configured to rest on a surface; and
    at least one post that projects from said base, said at least one post having at least two mounting arrangements, each mounting arrangement being configured to allow said display device to be mounted thereto in a fixed position, wherein:
  the mounting arrangements are configured such that the angle between the normal to the display screen and the normal to said surface is different when the display device is mounted to the respective mounting arrangements.

According to embodiments of the invention, there is also provided support stand for supporting a display device having a planar display screen, the support stand comprising:
  a base portion configured to rest on a surface; and
  at least one post that projects from said base, said at least one post having at least two mounting arrangements, each mounting arrangement being configured to allow said display device to be mounted thereto in a fixed position, wherein:
  the mounting arrangements are configured such that the angle between the normal to the display screen and the normal to said surface is different when the display device is mounted to the respective mounting arrangements.

Such a support stand, or display apparatus comprising such a support stand, enables the angle of the planar display screen to be tilted by changing which mounting arrangement the display device is mounted to. As such, the angle between the normal to the display screen and the normal to the surface on which the base is configured to rest may be referred to herein as the tilt angle. By changing the mounting arrangement to which the display device is mounted, the display device can be rotated from one position to another position about an axis that is substantially parallel to the surface on which the base portion is configured to rest. This surface maybe said to define a reference plane.

Thus, for example, the tilt angle of the display screen can be tailored, or adjusted, to the height of the surface on which the entertainment system is located. Additionally or alternatively, the tilt angle of the display screen can be tailored to the height from which the display screen is being viewed. Furthermore, the tilt angle can be readily adjusted by changing which mounting arrangement the display device is mounted to. This can be a straightforward operation. Furthermore, the display device can be securely and robustly mounted to the support stand at each different tilt angle because a separate, specifically designed, mounting arrangement may be provided on the or each post for each tilt angle. As such, there may be no need for complicated, potentially delicate and heavy moving joints to be provided, because each available tilt angle may be fixed by a dedicated mounting arrangement. Thus, the display device, and thus the display screen, can be moved between discrete tilt angles.

The mounting arrangements may be provided at different orientations around the or each post. This may mean that the mounting arrangements are provided at different angles around the or each post. For example, the or each post may have a longitudinal axis, and the mounting arrangements may be provided at different angular positions around that longitudinal axis.

Providing the mounting arrangements at different orientations around the or each post may enable the mounting arrangements to be separate from each other, such that each mounting arrangement can provide a dedicated, stable mounting for the display device.

The or each post may be attachable to the base at different orientations relative to the base. This may mean that the or each post is attachable to the base at more than one (for example at least two) angular positions about an axis that is normal to the surface on which the base portion is configured to rest. Such an axis may pass through the, or each respective post, and thus be referred to as a longitudinal axis of the post.

Providing the or each post to be attachable at different orientations relative to the base may allow each of the mounting arrangements to be orientated at different positions relative to the base. In turn, this may allow the display device to be mounted at different angular positions relative to the base without changing the mounting arrangement to which it is attached.

At each orientation at which the or each post is attachable to the base, the or each post may have a corresponding mounting arrangement for mounting the display device such that the display screen always faces in the same predetermined direction relative to the base.

This may mean, for example, that for each orientation at which a mounting arrangement is provided, the or each post is attachable relative to the base at a correspondingly orientated position. As such, the component of the normal to the display screen that lies in the plane of the surface on which the base portion if configured to rest always points (or can always point) in the same direction relative to the base. In this way, the tilt angle of the display screen can be adjusted without adjusting the main orientation (for example the angle about a vertical axis) of the display screen. Thus, the display screen can point in the same orientation (for example about a vertical axis) relative to a room, but at a different tilt angle.

The base may extend further in the predetermined direction than in the opposite direction.

This may enable the assembled display apparatus, including the display device and support stand, to be stable, for example not liable to fall over, for example due to the weight of the display device. The stability may be irrespective of which mounting arrangement the display device is mounted to.

The base may comprise at least one hole, the number of holes in the base being equal to the number of posts projecting therefrom; and the or each post may be configured to be attachable to the base at more than one orientation relative to the base by insertion through one of said holes at more than one orientation.

According to such an arrangement, the support stand can be modular. Providing a modular support stand has the advantage that it can be assembled, disassembled, and reassembled (for example in a different configuration) in a straightforward and reliable manner. As such, it can be easy for the user to change the tilt angle of the display screen. Additionally or alternatively, such an arrangement may allow the user to locate pre-defined orientations of the or each post relative to the base portion in a straightforward way, depending on the shape of the hole.

The or each post may have a portion that is configured to cooperate with its corresponding hole when the post is inserted into the hole; and the shape of the or each hole may correspond to the shape of the portion of its corresponding post that is configured to cooperate with it.

In this way, the or each post can be located into its corresponding hole. This may simplify the construction of the support stand for the user, for example by defining the orientation(s) at which the or each post can be inserted into its corresponding hole. Depending on the shape of the hole (and the corresponding shape of the portion of the post) it may be possible to insert the or each post into its corresponding hole in more than one orientation. For example, if the holes were rectangular, then the or each post could be inserted in at least two different orientations (which would be 180 degrees apart). If the holes were square, then the or each post could be inserted in four different orientations (which would be 90 degrees apart). If the holes were equilateral triangles, then the or each post could be inserted in three different orientations (which would be 120 degrees apart).

The or each post and hole may have a fixing that allows the or each post to be fixed into position in a corresponding hole at each orientation. Such a fixing may ensure that, once attached in position to the base, the or each post cannot accidentally fall out of position. This can help to ensure that the support stand is stable, and/or easy to handle. However, the fixing may still allow the support stand to be disassembled and reassembled by a user as required, for example to change the orientation of the or each post relative to the base. The fixing may have more than one part. A part of the fixing may be provided in as part of the base. Alternatively or additionally, a part of the fixing may be provided by the or each post. Any suitable fixing could be used. By way of non-limitative example, any one or more of: a screw and thread; nut and bolt; and clip may be used.

Each mounting arrangement may comprise a flat surface, the respective flat surfaces of at least two mounting arrangements on the or each post being tilted at different angles relative to the surface on which the base portion is configured to rest; and the display device may comprise at least one corresponding flat surface, the or each of which is arranged to abut a flat surface of a mounting arrangement of a corresponding post.

According to this arrangement, the display device is mounted at least partially using a cooperating, or abutting, flat surface on the mounting arrangements. This may ensure that the desired tilt angle of the display screen can be achieved accurately for each mounting arrangement. It may provide a simple, and robust, arrangement for locating the display screen at a different tilt angle depending on which mounting arrangement the display device is mounted to.

Each mounting arrangement may comprise a holding mechanism for holding corresponding flat surfaces of the display device and the mounting arrangements together. Any suitable holding mechanism may be used. By way of non-limitative example, any one or more of: a screw and thread; nut and bolt; and clip may be used.

Providing a mechanism to hold the flat surfaces together may ensure that the desired tilt angle of the display screen is achieved accurately when the display device is mounted to a particular mounting arrangement.

The or each post may comprise two mounting arrangements. This would enable two different tilt angles of the display screen to be achieved.

The mounting arrangements on the or each post may be on opposite sides of the or each post. This may provide maximum separation between the mounting arrangements, which may assist the ease of use and provide a particularly stable arrangement. It may also allow a simple mounting arrangement to be used. For example, it may allow one or more parts of one mounting arrangement to be used by another mounting arrangement.

Each post may have at least one hole formed therethrough, the or each hole having openings on opposing sides of its respective post, the openings forming part of the mounting arrangements. This may provide a particularly simple and effective mounting arrangement. For example, some or all of the parts of one mounting arrangement (for example a hole and/or associated fastener) could also be used in another mounting arrangement. This could further simplify use and/or reduce cost and/or improve reliability.

In any of the described arrangements, the display device may be removably mounted to the mounting arrangements. This feature may allow a user to change the tilt angle of a display screen after assembly, for example more than once. This may be advantageous if, for example, the display apparatus is moved from one surface to another surface which could, for example, be at a different height.

BRIEF DESCRIPTION OF THE DRAWINGS

The invention will more clearly be understood from the following description, given by way of example only, with reference to the accompanying drawings, in which.

DETAILED DESCRIPTION OF THE PREFERRED EMBODIMENTS

Figure 1:
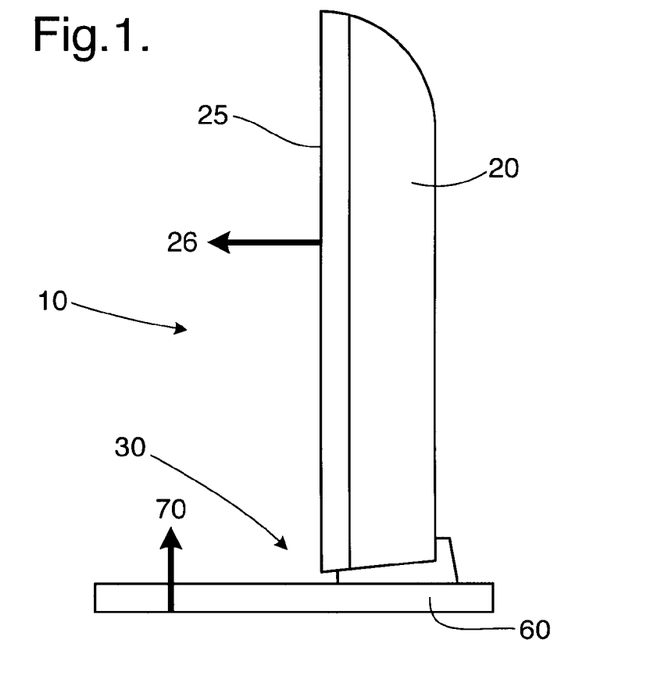
FIG. 1 shows a side view of a display device mounted on a support stand in a first position.

FIG. 1 shows a display apparatus 10 according to an embodiment of the present invention. The display apparatus 10 has a display device 20. The display device 20 has a planar display screen 25. The planar surface of the display screen 25 extends in a perpendicular direction to the plane of FIG. 1.

The display apparatus 10 shown in FIG. 1 also has a support stand 30. The support stand 30 has mounting arrangements 40 (shown in FIG. 3) on which the display device 20 is mounted. The mounting arrangements 40 are part of, or are attached to, one or more posts 50 (shown in FIG. 3) that project from a base portion 60 of the support stand 30. The base portion 60 is configured to rest on a surface on which the display apparatus 10 is located. The surface on which the display apparatus 10 is located may be referred to as a reference surface.

Figure 2:
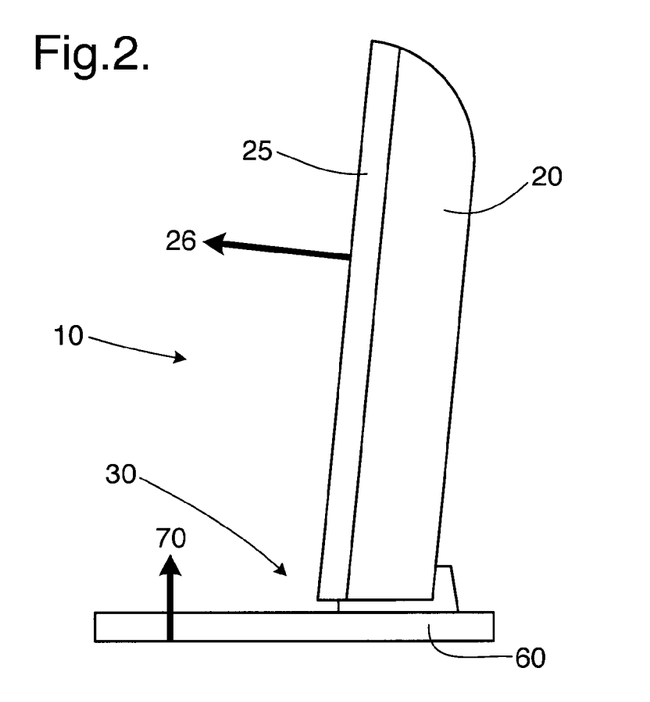
FIG. 2 shows a side view of a display device mounted on a support stand in a second position.

FIG. 2 shows the display apparatus 10 of FIG. 1 in which the display device is mounted at a different tilt angle relative to the base portion 60 (or relative to the surface on which the base portion 60 is configured to rest). In other words, the angle between the normal 26 to the display screen 25 and the normal 70 to the surface on which the display apparatus 10 is located is different in FIG. 2 to FIG. 1. This is shown by the difference in the angle between the arrows 26 and 70 representing the respective surface normals in FIG. 1 and FIG. 2.

Figure 3:
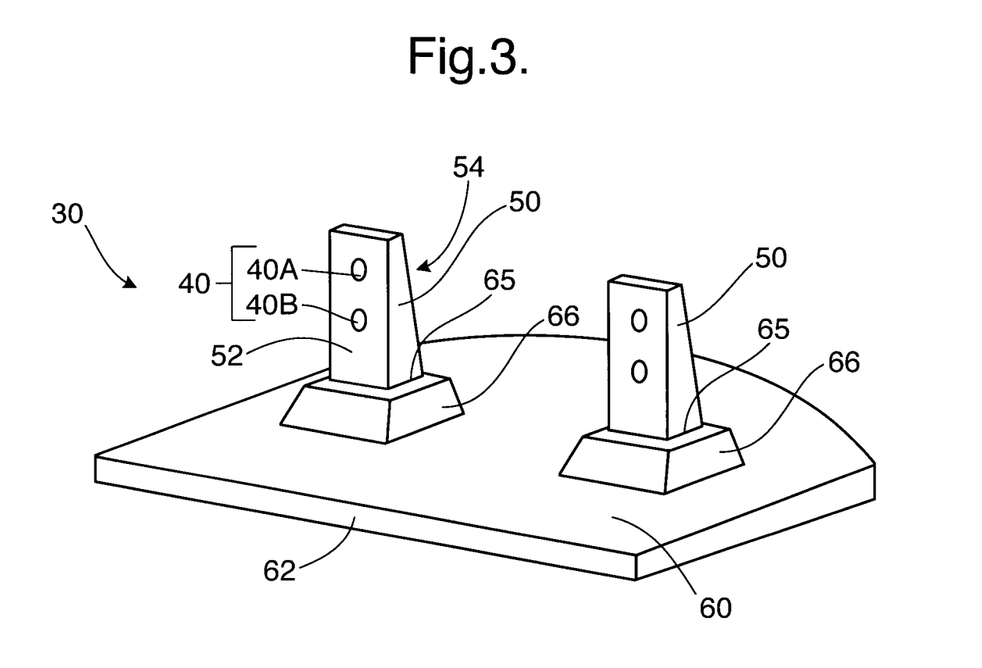
FIG. 3 shows a perspective view of a support stand for a display device according to an embodiment of the invention.

FIG. 3 shows the base portion 60 and posts 50 of a support stand 30 according to an embodiment of the present invention in greater detail.

Figure 8:
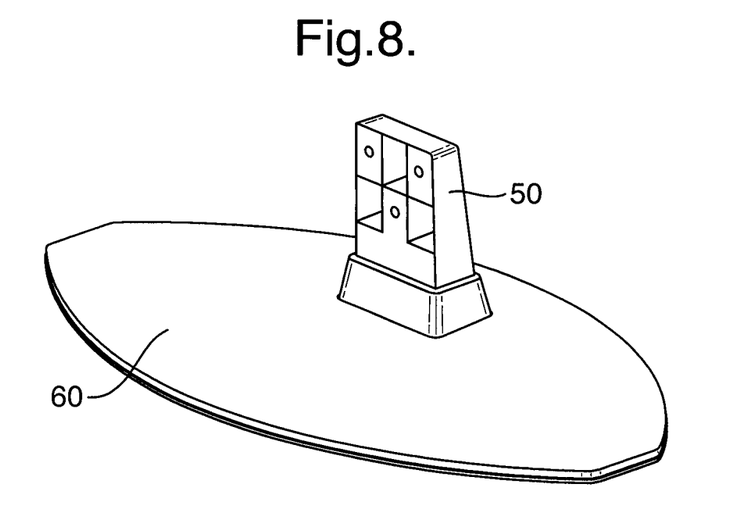
FIG. 8 shows a perspective view of a support stand for a display device according to an embodiment of the invention which has just one post protruding from its base.

The base portion 60 has two holes 65 formed therein. In FIG. 3, the holes 65 are formed in raised portions 66 in the base 60. In the example of FIG. 3, a post 50 has been inserted into each hole 65. Thus, the hole 65 may be said to be closed by the post 50. Other embodiments may have fewer than, or more than two holes 65, for example, one, three, four, five, six, seven, eight, or more than eight holes 65. The number of holes 65 (or, in more general terms, the number of positions for mounting the post or posts 50 on the base 60) is equal to the number of posts 50. FIG. 8, for example, shows an embodiment that has just one post 50. The single post 50 of FIG. 8 is attached to, or extends from, the base 60.

In the embodiment of FIG. 3, the shape of the holes 65 corresponds to the shape of the part of the posts 50 that cooperates (i.e. touches, or abuts) with the holes 65. In the example of FIG. 3, the holes 65 are rectangular, but other shapes (such as triangles, ovals, circles, and squares) could be used.

The posts 50 protrude, or extend, from the base 60 through the holes 65. Each post has at least two mounting arrangements 40. The embodiment of FIG. 3 has two mounting arrangements 40 on each post 50, but in FIG. 3, part of just one mounting arrangement 40 is visible on the flat surface 52 of each post 50.

The visible mounting arrangement 40 of each post 50 shown in FIG. 3 comprises two holes 40A and 40B extending though the post 50 from the surface 52 (or face 52) of the post 50. In the embodiment of FIG. 3, the surface 52 is a flat surface 52. A fixing, such as a threaded fixing (for example a screw), may be inserted into the holes 40A, 40B in order to mount a display device 20 to the posts 50 of the support stand 30. Thus, the holes 40A, 40B may have a corresponding thread. The threaded fixing(s) may be considered to be part of the mounting arrangement 40.

Any suitable mounting arrangement 40 could be used. For example, the mounting arrangements 40 could protrude from a surface of the post 50. The protrusions could cooperate with corresponding portions of the display device 20 in order to mount the display device 20 to the support stand 30. By way of alternative example, the mounting arrangements 40 could comprise a cutout, or slot, or notch, into which a corresponding portion on the display device 20 is located in order to mount the display device 20 to the support stand 30.

Taking just one of the two posts 50 for ease of explanation, the other mounting arrangement 40 (not visible) is on the flat surface (or face) 54 that is on the other side of the post 50. Thus, it is at a different orientation around the post 50. In FIG. 3, the two mounting arrangements are thus orientated at approximately 180 degrees apart from each other around the post 50. The post 50 may be said to have a longitudinal axis (which may be said to be substantially perpendicular to the surface on which the base portion 60 is configured to rest). Using that terminology, the mounting arrangements 40 may be said to be at different angular positions on the post 50 around its longitudinal axis.

As stated above, different embodiments may have different numbers of mounting arrangements on the or each post 50. For example, other embodiments may have three, four, five, six, seven, eight, nine, ten, or more than ten mounting arrangements 40 on each post 50. Regardless of the number of mounting arrangements 40 on each post 50, they may be positioned at different orientations around the post 50. For example, they may be positioned at equal angular separations around their post 50.

Although reference may be made to the mounting arrangements 40 on one post 50, it will be appreciated that embodiments with more than one post 50 (such as that in FIG. 3) would have corresponding mounting arrangements 40 on each post 50. The mounting arrangements 40 on different posts 50 in such embodiments mount to different parts of the display device 20.

As stated above, the holes 65 in the embodiment of FIG. 3 are rectangular. As such, they are arranged such that the posts 50 can be inserted through them in two different orientations. Thus, the posts can be attached to the base 60 at two different orientations. In the embodiment of FIG. 3, the two different orientations are 180 degrees apart. This means that either of the two surfaces 52, 54 of the posts 50 can be arranged to point towards (i.e the surface normal of those surfaces 52, 54 can be arranged to point towards) a front edge, or front portion, 62 of the base 60. This is shown in FIGS. 4 and 5.

Figure 4:
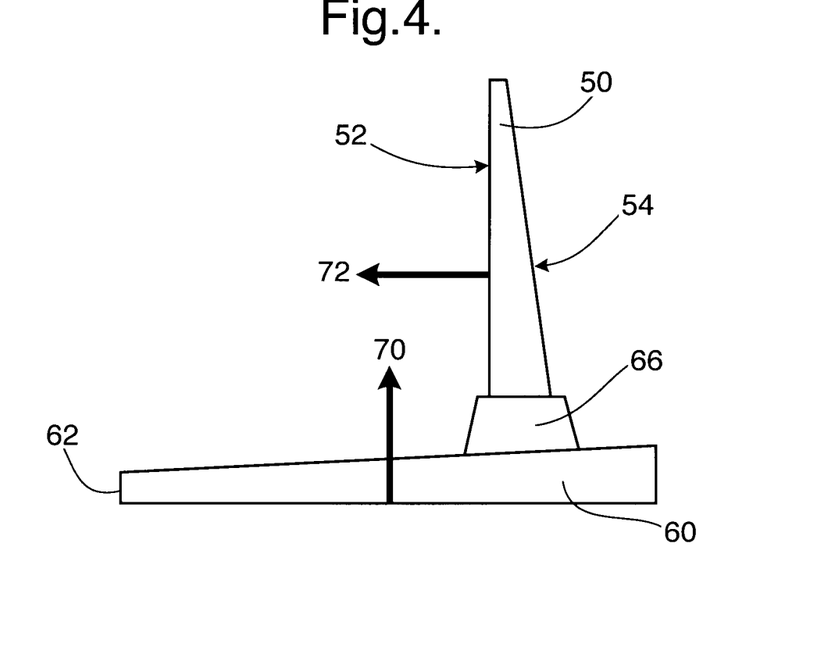
FIG. 4 shows a side view of a support stand according to the present invention.
Figure 5:
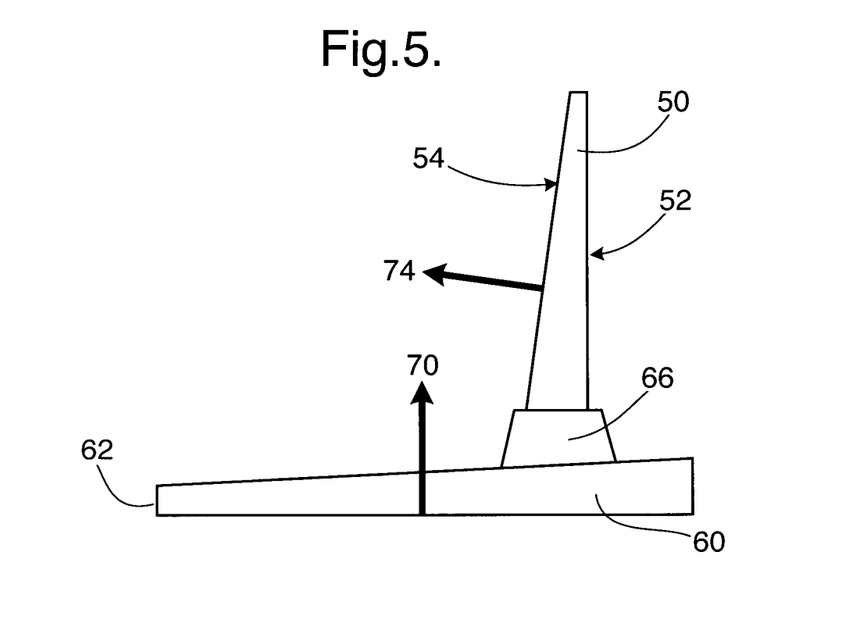
FIG. 5 shows a side view of a support stand according to claim 4, in which the orientation of the posts has been changed.

In FIG. 4, the flat surface 52 points towards the front edge 62 of the base 60. In FIG. 5, the flat surface 54 points towards the front edge 62 of the base 60. The movement of the post 50 between the position shown in FIG. 4 and that in FIG. 5 is described herein in relation to FIGS. 6 and 7.

Both of the flat surfaces 52, 54 that can point towards the front edge portion 62 have associated mounting arrangements 40. This means that the display device can be mounted to either of the two flat surfaces 52, 54. Furthermore, in FIG. 3, the angle between the mounting arrangements on each flat surface 52, 54 around the post 50 is the same as the angle between the two different orientations at which the post 50 is attachable to the base 60, namely 180 degrees. This means that the mounting arrangements 40 on the flat surface 52 can face in the same predetermined direction relative to the base 60 as the mounting arrangements 40 on the flat surface 52. This can be achieved by changing the orientation at which the post 50 is attached to the base 60.

In different embodiments, the hole shape need not be rectangular. Any shape could be used. In some embodiments, shapes which have rotational symmetry of at least order two are used. As will be understood from the description above in relation to the rectangular holes, having rotational symmetry of at least order two enables the posts 50 to be inserted into the holes 65 in more than one orientation. This can enable different mounting arrangements 40 to face in a predetermined direction relative to the base 60 (for example in the direction of a front edge 62). For example, if holes 65 (and corresponding post portions) with a rotational symmetry of order 3 are used (for example an equilateral triangle), then three different mounting arrangements 40 could face in a predetermined direction relative to the base 60. By way of further example, if holes 65 (and corresponding post portions) with a rotational symmetry of order 4 are used (for example a square), then four different mounting arrangements 40 could face in a predetermined direction relative to the base 60.

In some embodiments, rotational symmetry of the posts is not required. In such embodiments, mounting arrangements 40 can still face in a predetermined direction relative to the base 60. For example, so long as the angular separation between orientations at which the or each post 50 can be attached to the base 60 is the same as the angular separation between the orientations of the corresponding mounting arrangements 40 around the or each post 50, then the different mounting arrangements 40 can still face in a predetermined direction relative to the base 60 when the orientation of the post 50 attachment to the base 60 is changed.

Turning now to the embodiment shown in FIG. 3, the two flat surfaces 52, 54 have surface normals that form a different angle with the normal to the base 60, or the normal 70 to the surface on which the base 60 is configured to rest. This can be seen in FIGS. 4 and 5, in which the normal to the surface on which the base 60 rests is denoted by arrow 70, the normal to the surface 52 is denoted by arrow 72, and the normal to the surface 54 is denoted by arrow 74.

This arrangement allows the planar screen 25 of the display device 20 to be at a different tilt angle depending on whether it is mounted to the mounting arrangements 40 on the flat surface 52 or the mounting arrangements 40 on the flat surface 54. In some embodiments, the display device 20 has one or more flat surfaces that correspond to at least a part of the surfaces 52, 54 of the post 50. In such embodiments, the or each flat surface of the display device is arranged to abut the flat surface 52 and the flat surface 54 of the post 50. Which of the two flat surfaces 52, 54 the flat surface of the display device abuts at a given time depends on which flat surface 52, 54 the display device 20 is being mounted to. In such embodiments, the difference between the angle of the normal to the two flat surfaces 52, 54 of the post 50 corresponds to the difference between the tilt angle of the planar display screen when it is mounted to the respective flat surfaces 52, 54.

As mentioned elsewhere herein, any suitable mounting arrangement 40 may be used. In some embodiments, the mounting arrangement 40 may not comprise a flat surface.

In the embodiment of FIG. 3, the posts 50 are removable from the base 60. This enables the orientation of the post to be rotated relative to the base 60. This means that the post 50 can be switched in orientation from that shown in FIG. 4 to that shown in FIG. 5. An example of a process used to change the orientation of the post 50 relative to the base 60 will be explained below with reference to FIGS. 6 and 7.

Figure 6:
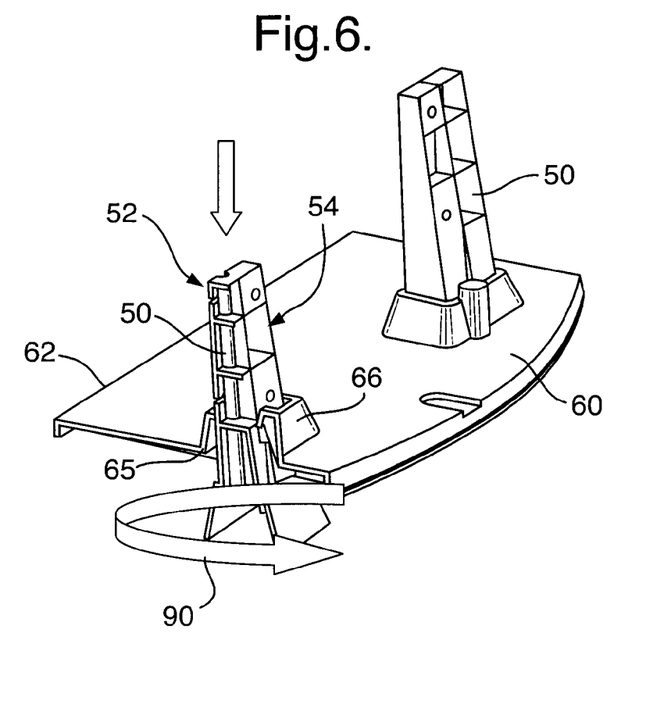
FIG. 6 shows a perspective view of a support stand according to the present invention in which one of the posts is being removed.
Figure 7:
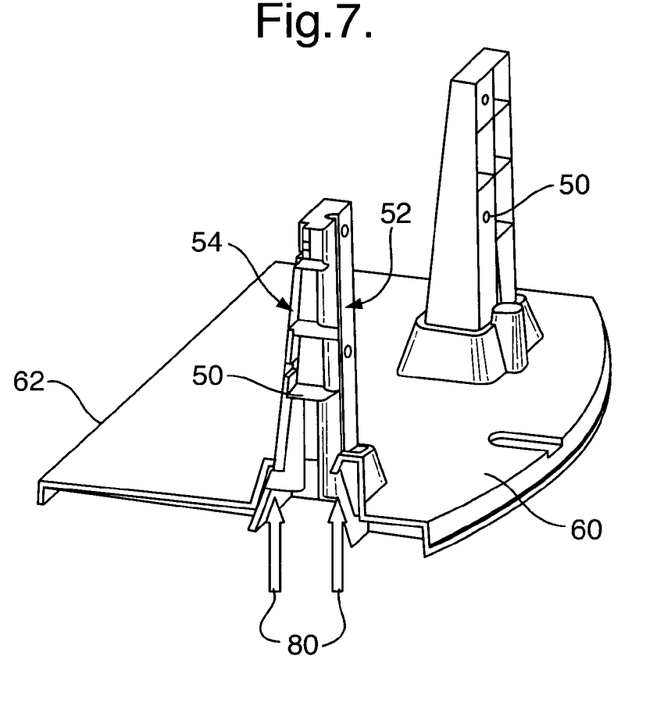
FIG. 7 shows the support stand of FIG. 6, in which the post is being re-attached to the base at a different orientation.

In FIG. 6, one of the posts 50, which is shown in a partial section view, is being removed from the base 60. As shown in FIG. 6, the post 50 is removed through the underside of the base 60, through the hole 65. Some embodiments may include a fixing that fixes the post 50 into position in its corresponding hole 65. Such a fixing may comprise, for example, a screw inserted through dedicated holes in the post 50 and the base 60. The arrows 80 shown in FIG. 7 represent screws being inserted through the post 50 and base 60 upon reassembly. Alternative fixings could be used, for example, clips, notches, and other fastenings. Alternatively, some embodiments may not include such a fixing. In any embodiments that do include such a fixing, the retaining force of the fixing would have to be removed before the post 50 could be extracted through the hole 65 as shown in FIG. 6.

FIG. 6 also includes an arrow 90 that indicates rotation of the post relative to the base 60. This rotation 90 is performed after the post 50 has been removed, or sufficiently removed, from the hole 65. The rotation 90 may be said to be about a longitudinal axis of the post 50 in the example shown in FIG. 6.

Once the post has been rotated by the correct amount (180° in the example of FIG. 6), it can be re-inserted into the hole 65. The fixings 80 may then be used, as required, to fix the post 50 into its new orientation relative to the base 60.

In order to change the tilt angle of the display screen 25 of the display device 20, the following process may therefore be performed. Firstly, the display device 20 may be removed from the or each post 50. This may require the mounting arrangement 40 to be undone in the manner appropriate for the particular mounting arrangement used. The display device 20 can then be set to one side. With the display device 20 removed from the support stand 30, the orientation of the posts can then be changed in the manner described above in relation to FIGS. 6 and 7. In this way, a different set of mounting arrangements can be made to face a predetermined direction, for example the front edge 62 of the base 60. The display device 20 can then be re-attached to the post 50 using the different set of mounting arrangements 40 that now face towards the front edge 62 of the base 60. These different mounting arrangements 40 can be configured such that, when the display device is mounted to them, the surface normal 26 of the planar display screen 25 is at a different angle to the normal 70 to the surface on which the base portion 60 rests to the angle at the start of the operation.

In the embodiment described above in relation to FIGS. 6 and 7 (and indeed in the embodiment described below in relation to FIG. 9), the size of the base portion 60 in the direction of a front edge 62 may be bigger than in the opposite direction. Thus, the size of the base portion 60 in the direction in which the planar display screen 25 faces may be larger than the size in the opposite direction. This may help to improve the stability of the display apparatus, for example by reducing the likelihood of it toppling forwards in the direction in which the planar display screen 25 faces.

Figure 9:
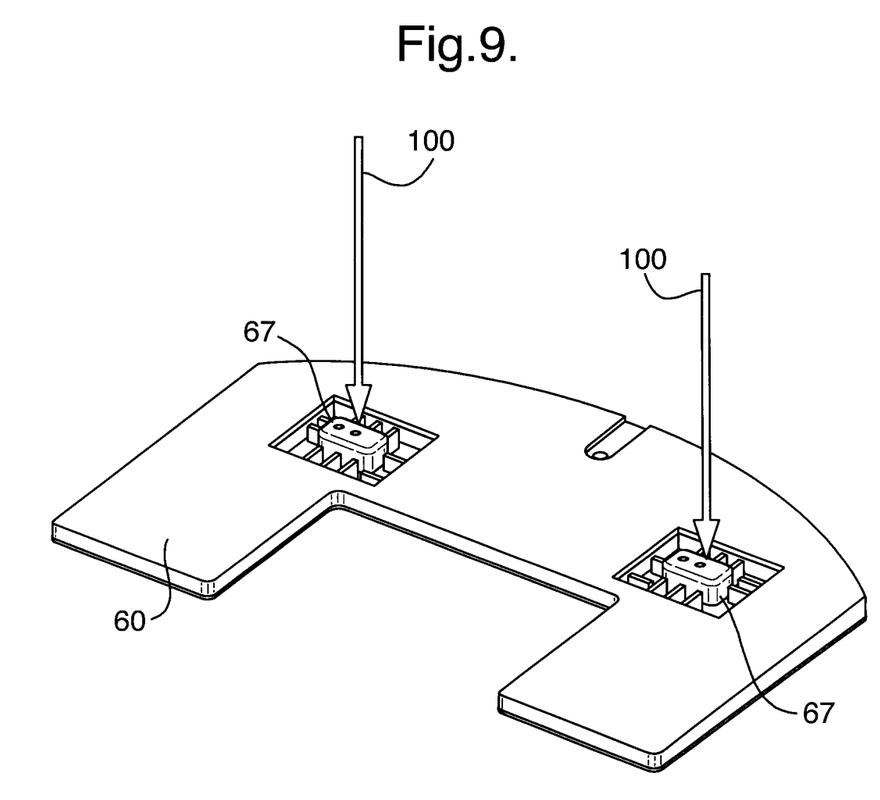
FIG. 9 shows the base portion for a support stand in which the posts are plugged into post platforms on the base portion.

In some embodiments, the posts 50 may be attached to the base 60 without inserting them through holes 65 in the base 60. As such, in some embodiments, the base 60 may not have the holes 65. The base 60 for such an embodiment is shown in FIG. 9. As shown in FIG. 9, the base 60 has post platforms 67

(which may be referred to as mountings, or post mountings). The posts 50 are attached, or mounted, to the base 60 using the post platforms 67. For example, the posts 50 may have corresponding engagement portions that attach onto or into, or engage with, the post platforms 67 in order to mount the posts 50 onto the base 60.

All of the relevant features described herein in relation to an embodiment in which the posts 50 are inserted through holes 65 in the base 60 also apply to embodiments in which the posts 50 are attached to the base 60 using post platforms 67. Thus, for example, any number of posts 50 may be attached to the base 60 using the post platforms 67. Furthermore, the post platforms 67 may allow the posts 50 to be mounted onto the base 60 at more than one orientation. As with the embodiment in which the posts are attached through holes 65 in the base 60, the orientations at which the posts 50 can be attached to the base 60 using the post platforms 67 may correspond to the orientations at which the mounting arrangements 40 are provided on the posts 50.

In the embodiment shown in FIG. 9, the posts 50 may be mounted onto the base 60 by pushing them in the direction of the arrows 100. Similarly, the posts 50 may be removed from the base 60 by moving (for example pulling) them in the direction opposite to the arrows 100.

In some embodiments, the posts 50 may be fixed relative to the base 60. Thus, referring to FIG. 3, the surface 52 of the post 50 would always face in the direction of the front edge 62 of the base 60, and the surface 54 of the post 50 would always face away from the front edge 62 of the base 60 in such an embodiment. Of course, in embodiments in which the posts 50 are fixed relative to the base 60, the operation for moving the orientation of the posts 50 relative to the base 60 described above in relation to FIGS. 6 and 7 is not relevant.

In an embodiment where the posts 50 are fixed relative to the base 60, the tilt angle of the planar display screen 25 may be changed by removing the display device 20 from one set of mounting arrangements 40, and then re-attaching it to another set of mounting arrangements 40 on another part of the post 50. For example, with reference to FIG. 3, the display device 20 could be removed from the mounting arrangements 40 on the surface 52, and then re-attached to the mounting arrangements 40 on the surface 54. Thus, in such an embodiment, the direction in which the planar display screen 25 faces relative to the base also changes in addition to the change in tilt angle.

Referring once again to FIG. 3, in an embodiment where the posts 50 are fixed relative to the base 60, the planar display screen would face in the direction of the front edge 62 of the base 60 when attached to the mounting arrangements 40 on surface 52, and would face away from the front edge 62 of the base 60 when mounted to the mounting arrangements 40 of the surface 54. Of course, in such an embodiment, the post 50 may comprise any number of mounting arrangements 40 at different orientations around it. Each set of mounting arrangements 40 may be configured to mount the display device 20 such that the planar display screen 25 is at a different tilt angle. For example, there could be two, three, four, five, six, seven, eight, nine, ten or more than ten mounting arrangements 40 at different orientations around the or each post 50. Each mounting arrangement 40 may be configured to result in a different tilt angle of the planar display screen 25 when the display device 20 is attached to it. In such an embodiment in which the posts 50 are fixed relative to the base 60, the base 60 is arranged (for example shaped), and/or the posts 50 are arranged (for example positioned) on the base 60 such that the display apparatus is stable regardless of to which mounting arrangement 40 the display device 20 is mounted.

Although specific embodiments have been described above in relation to the figures, it will be appreciated that various other arrangements fall within the scope of the present invention as defined in the attached claims. For example, in one embodiment the post 50 and base 60 may be initially provided separately from each other (for example in modular form), but once they are assembled together for the first time, the post 50 may become fixed in place relative to the base 60. This gives a user an option as to which tilt angle to use, but once the tilt angle has been chosen, it is permanently fixed.

Furthermore, it will be appreciated that any feature described herein in relation to a particular embodiment may be combined with any other compatible feature described in relation to a different embodiment.

I claim:

1. A display apparatus comprising:
a display device having a planar display screen; and
a support stand to support the display device, the support stand including:
a base portion configured to rest on a surface; and
at least one post that projects from said base portion, said at least one post having at least two mounting arrangements, each mounting arrangement being configured to allow said display device to be mounted thereto in a fixed position, wherein:
the mounting arrangements are configured such that an angle between normal to the display screen and normal to the surface is different when the display device is mounted to the respective mounting arrangements; and
the mounting arrangements are provided at different orientations around each said post.

2. A display apparatus according to claim 1,
wherein each said post is attachable to the base portion at different orientations relative to the base portion.

3. A display apparatus according to claim 2,
wherein at each orientation at which each said post is attachable to the base portion, each said post has a corresponding mounting arrangement to mount the display device such that the display screen always faces in a same predetermined direction relative to the base portion.

4. A display apparatus according to claim 3,
wherein the base portion extends further in the same predetermined direction than in an opposite direction to the same predetermined direction.

5. A display apparatus according to claim 1, wherein:
the base portion comprises at least one hole, a number of holes in the base portion being equal to a number of posts projecting therefrom; and
each said post is configured to be attachable to the base portion at more than one orientation relative to the base portion by insertion through one of said holes at more than one orientation.

6. A display apparatus according to claim 5, wherein:
each said post has a portion that is configured to cooperate with its corresponding hole when the post is inserted into the hole; and
a shape of each said hole corresponds to a shape of the portion of its corresponding post that is configured to cooperate with it.

7. A display apparatus according to claim 5,
wherein each said post and corresponding hole have a fixing that allows each said post to be fixed into position in the corresponding hole at each orientation.

8. A display apparatus according to claim 1, wherein:
the base portion comprises at least one post platform, a number of post platforms on the base portion being equal to a number of posts projecting therefrom; and
each said post is configured to be attachable to the base portion at more than one orientation relative to the base portion by attachment to one of said post platforms at more than one orientation.

9. A display apparatus according to claim 1, wherein:
each mounting arrangement includes a flat surface, the respective flat surfaces of said at least two mounting arrangements on each said post being tilted at different angles relative to the surface on which the base portion is configured to rest; and
the display device includes at least one flat surface, each of which is arranged to abut a corresponding flat surface of a mounting arrangement of a corresponding post.

10. A display apparatus according to claim 9,
wherein each mounting arrangement includes a holding mechanism to hold corresponding flat surfaces of the display device and the mounting arrangement together.

11. A display apparatus according to claim 1,
wherein each said post includes two mounting arrangements.

12. A display device according to claim 11,
wherein the mounting arrangements on each said post are on opposite sides of each said post.

13. A display device according to claim 11,
wherein each said post has at least one hole formed therethrough, each said hole having openings on opposing sides of its respective post, the openings forming part of the mounting arrangements.

14. A display device according to claim 12,
wherein each said post has at least one hole formed therethrough, each said hole having openings on opposing sides of its respective post, the openings forming part of the mounting arrangements.

15. A display device according to claim 1, configured such that the display device is removably mounted to the mounting arrangements.

16. A support stand to support a display device having a planar display screen, the support stand comprising:
a base portion configured to rest on a surface; and
at least one post that projects from said base portion, said at least one post having at least two mounting arrangements, each mounting arrangement being configured to allow said display device to be mounted thereto in a fixed position, wherein:
the mounting arrangements are configured such that an angle between normal to the display screen and normal to the surface is different when the display device is mounted to the respective mounting arrangements; and
the mounting arrangements are provided at different orientations around each said post.

* * * * *